United States Patent
Nakagawa et al.

(10) Patent No.: US 9,694,701 B2
(45) Date of Patent: Jul. 4, 2017

(54) VEHICLE CHARGING APPARATUS

(71) Applicants: Nobuyuki Nakagawa, Miyoshi (JP); Yuta Ochiai, Toyota (JP); Yukihiro Miyashita, Toyota (JP); Hiroshi Nagao, Chiryu (JP); Takeshi Hagihara, Osaka (JP); Yoshikazu Isoyama, Yokkaichi (JP)

(72) Inventors: Nobuyuki Nakagawa, Miyoshi (JP); Yuta Ochiai, Toyota (JP); Yukihiro Miyashita, Toyota (JP); Hiroshi Nagao, Chiryu (JP); Takeshi Hagihara, Osaka (JP); Yoshikazu Isoyama, Yokkaichi (JP)

(73) Assignees: Toyota Jidosha Kabushiki Kaisha, Toyota-shi, Aichi-ken (JP); Sumitomo Electric Industries, Ltd., Osaka-shi, Osaka (JP); Sumitomo Wiring Systems, Ltd., Yokkaichi-shi, Mie (JP); Autonetworks Technologies, Ltd., Yokkaichi-shi, Mie (JP)

( * ) Notice: Subject to any disclaimer, the term of this patent is extended or adjusted under 35 U.S.C. 154(b) by 149 days.

(21) Appl. No.: 14/379,569

(22) PCT Filed: Feb. 21, 2013

(86) PCT No.: PCT/IB2013/001481
§ 371 (c)(1),
(2) Date: Aug. 19, 2014

(87) PCT Pub. No.: WO2013/128298
PCT Pub. Date: Sep. 6, 2013

(65) Prior Publication Data
US 2015/0022152 A1 Jan. 22, 2015

(30) Foreign Application Priority Data
Feb. 27, 2012 (JP) ................. 2012-040677

(51) Int. Cl.
*H02J 7/00* (2006.01)
*B60L 11/18* (2006.01)
(Continued)

(52) U.S. Cl.
CPC ......... *B60L 11/1818* (2013.01); *B60L 3/0084* (2013.01); *B60L 3/04* (2013.01);
(Continued)

(58) Field of Classification Search
CPC .................................................... Y02T 90/14
(Continued)

(56) References Cited

U.S. PATENT DOCUMENTS

2012/0098490 A1 4/2012 Masuda
2013/0088200 A1* 4/2013 Kamishima ............ B60L 3/04
320/109

FOREIGN PATENT DOCUMENTS

CN 201210314 3/2009
CN 201345392 11/2009
(Continued)

*Primary Examiner* — Suresh Memula
(74) *Attorney, Agent, or Firm* — Finnegan, Henderson, Farabow, Garrett & Dunner, LLP

(57) ABSTRACT

A vehicle charging apparatus mounted on a vehicle for charging an on-vehicle battery from an external power supply, with a charging plug connected to the vehicle, includes a communication device that is configured to perform communication with a charging facility providing the external power supply with the charging plug connected and locked to the vehicle. The communication device prohibits disconnection of the communication when an unlocking operation to unlock the charging plug is executed during charging from the external power supply to the on-vehicle battery.

8 Claims, 6 Drawing Sheets

(51) Int. Cl.
 *B60L 3/04* (2006.01)
 *B60L 3/00* (2006.01)
 *B60L 11/00* (2006.01)

(52) U.S. Cl.
 CPC ......... *B60L 11/005* (2013.01); *B60L 11/1803* (2013.01); *B60L 11/1816* (2013.01); *B60L 11/1824* (2013.01); *B60L 11/1838* (2013.01); *B60L 11/1846* (2013.01); *B60L 2240/70* (2013.01); *B60L 2240/80* (2013.01); *B60L 2270/32* (2013.01); *B60L 2270/34* (2013.01); *Y02T 10/7005* (2013.01); *Y02T 10/7022* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
 USPC ........................................................ 320/109
 See application file for complete search history.

(56) References Cited

FOREIGN PATENT DOCUMENTS

| | | |
|---|---|---|
| EP | 1 655 830 A1 | 5/2006 |
| JP | 2007-236173 | 9/2007 |
| JP | 2010-124556 | 6/2010 |
| JP | 2010-264847 | 11/2010 |
| JP | 2011-15529 | 1/2011 |
| JP | 2012-18912 | 1/2012 |
| WO | WO 2010/150360 A1 | 12/2010 |
| WO | WO 2011/155207 A1 | 12/2011 |

\* cited by examiner

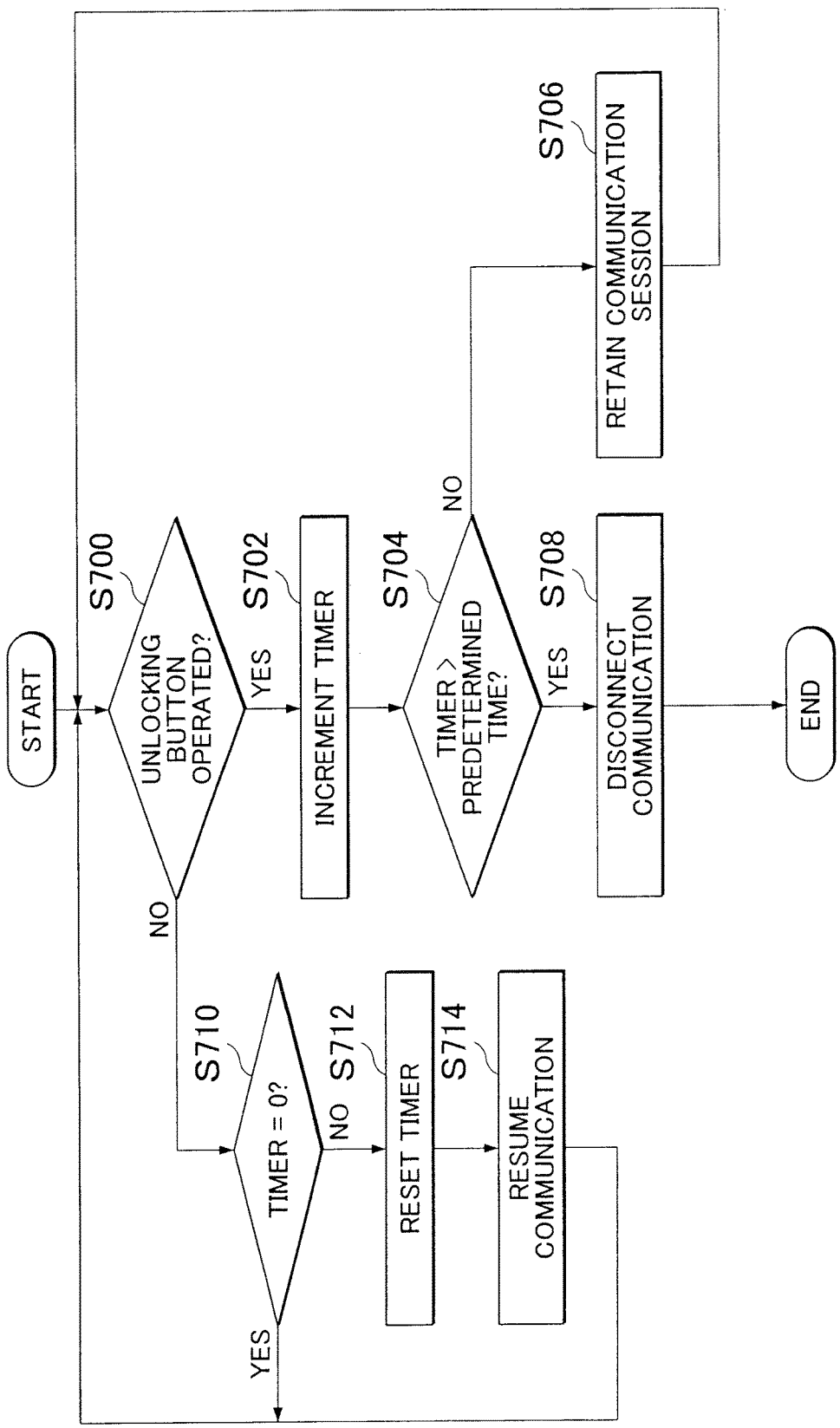

VEHICLE CHARGING APPARATUS

CROSS-REFERENCE TO RELATED APPLICATIONS

This application is a national phase application of International Application No. PCT/IB2013/001481, filed Feb. 21, 2013, and claims the priority of Japanese Application No. 2012-040677, filed Feb. 27, 2012, the content of both of which is incorporated herein by reference.

BACKGROUND OF THE INVENTION

1. Field of the Invention

This invention relates to a vehicle charging apparatus mounted on a vehicle for charging an on-vehicle battery from an external power supply by way of a charging plug connected to the vehicle.

2. Description of Related Art

This type of conventional vehicle charging apparatus has been available (see WO2010/150360, for example).

This conventional type of vehicle charging apparatus is configured to determine the rated current of a charging facility on the vehicle side based on a voltage value of a pilot signal (i.e. a Control Pilot Line Transmission (CPLT) signal), but does not involve communication between the charging facility and the vehicle during charging.

SUMMARY OF THE INVENTION

In view of the problem described above, the invention provides a vehicle charging apparatus which has a function to perform communication between a charging facility and a vehicle during charging, and is capable of preventing disconnection of communication when an operation to unlock the charging plug is executed during charging.

An aspect of the invention provides a vehicle charging apparatus mounted on a vehicle for charging an on-vehicle battery from an external power supply with a charging plug connected to the vehicle, including a communication device that is configured to perform communication with a charging facility providing the external power supply with the charging plug connected and locked to the vehicle. The communication device prohibits disconnection of the communication when an unlocking operation to unlock the charging plug is executed during charging from the external power supply to the on-vehicle battery.

In the vehicle charging apparatus, the prohibition of disconnection of the communication may preferably include stopping communication in an Application layer in the Open Systems Interconnection (OSI) reference model based on which the communication is performed, while retaining an established state of a communication session in a Session layer and layers therebelow.

In the vehicle charging apparatus, the communication device may preferably be configured to disconnect the communication when the unlocking operation is executed continuously for a predetermined time period during charging from the external power supply to the on-vehicle battery.

In the vehicle charging apparatus, the communication device may preferably be configured to disconnect the communication when the charging plug is physically removed from the vehicle during charging from the external power supply to the on-vehicle battery.

In the vehicle charging apparatus, the disconnection of the communication may preferably include disconnection of the communication session in a Session layer and layers therebelow in the OSI reference model based on which the communication is performed.

In the vehicle charging apparatus, the communication device may preferably be configured to perform communication with the charging facility in an Application layer in the OSI reference model based on which the communication is performed after performing communication for user verification and authentication with the charging facility when the charging plug is connected and locked to the vehicle. Further, the communication device may preferably be configured to resume the communication in the Application layer without performing the communication for user verification and authentication when an unlocking operation to unlock the charging plug is executed during charging from the external power supply to the on-vehicle battery but the unlocking operation is cancelled without being continued for the predetermined time period, and the charging plug (20) is locked again.

In the vehicle charging apparatus, the communication device may preferably be configured to communicate information on an amount of charged electricity with the charging facility in an Application layer in the OSI reference model based on which the communication is performed, during charging from the external power supply to the on-vehicle battery The vehicle charging apparatus may preferably further include a charge controller that is configured to perform charging from the external power supply to the on-vehicle battery when the charging plug is connected and locked to the vehicle, and the user verification and authentication are successful through communication between the communication device and the charging facility.

In the vehicle charging apparatus, the charge controller may preferably be configured to suspend the charging from the external power supply to the on-vehicle battery when an unlocking operation to unlock the charging plug is executed during charging from the external power supply to the on-vehicle battery.

The vehicle charging apparatus as described above has a function to perform communication between the charging facility and the vehicle during charging, and is capable of preventing the communication from being disconnected when an unlocking operation to unlock the charging plug is executed during charging.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart showing an example of communication disconnection determination processing executed by the communication device shown in FIG. 1.

DETAILED DESCRIPTION OF EMBODIMENTS

Figure 1:
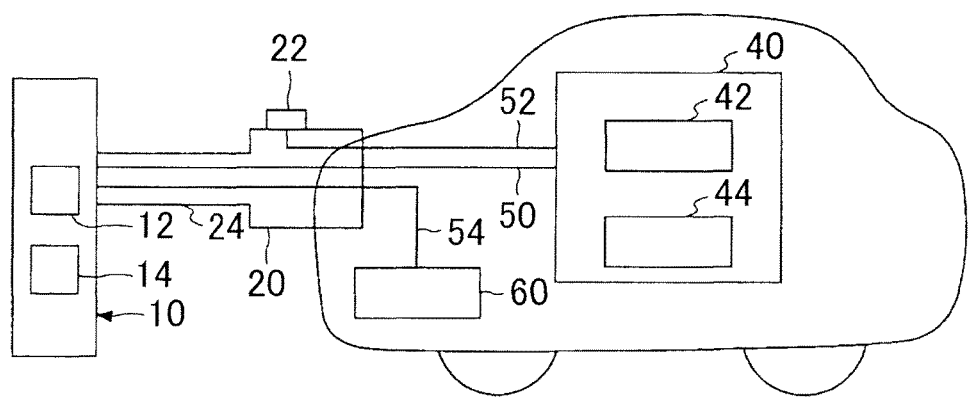
FIG. 1 is a diagram schematically illustrating an example of a charging station (charging facility) together with an example of a vehicle charging apparatus according to an embodiment of the invention.

An embodiment for carrying out the invention will be described with reference to the drawings. FIG. 1 is a diagram schematically showing an example of a charging station 10 together with an example of a vehicle charging apparatus 40 mounted on a vehicle. In FIG. 1, the charging station 10 is connected to the vehicle via a charging plug 20 and a cable 24. The charging plug 20 and the cable 24 may be configured integrally with each other. The charging plug 20 and the cable 24 may be installed on the charging station 10. Further, the charging plug 20 and the cable 24 may be brought by a user and connected to the charging station 10.

The vehicle is an electric vehicle which can be charged from an external power supply. The electric vehicle is typically a plug-in hybrid vehicle or a battery electric vehicle. Hereafter, any electric vehicle that can be charged from an external power supply shall be simply referred to as the "vehicle". The vehicle has a battery 60 which is an externally chargeable battery and is used as a power source for a vehicle driving motor. The battery 60 may be any battery as long as it is chargeable, such as, for example, a nickel-metal hydride battery or an electric double layer capacitor. The battery 60 may be connected to the vehicle driving motor via an inverter (not shown).

The charging station 10 has a charging station side communication device 12. The charging station 10 has an external power supply (power supply for supplying power for charging a battery) 14. The charging station 10 may be of any type. For example, the charging station 10 may be a standard charging station using a power supply of single-phase AC 100 V or 200 V, or may be a quick charging station using a power supply of three-phase AC 200 V.

The charging plug 20 has an unlocking button 22. The charging plug 20 enters a locked state once it is connected to a vehicle in a predetermined manner. When a user operates (presses) the unlocking button 22 in this locked state, the locking state is released. Thus, the user is allowed to remove the charging plug 20 from the vehicle by pulling out the charging plug 20 while operating (pressing) the unlocking button 22. However, the physical connection between the charging plug 20 and the vehicle is not disconnected only by the operation (pressing) of the unlocking button 22 by the user. That is, the physical connection is retained and only the locking is released. While a variety of detailed configuration options are possible for the charging plug 20, the charging plug 20 may be of any configuration as long as it has the unlocking button 22.

The vehicle charging apparatus 40 is mounted on a vehicle, and includes a communication device 42 and a charge controller 44 as its principal components.

The communication device 42 may be constituted by an electronic control unit (ECU). The ECU is constituted, for example, by an arithmetic processing unit including a central processing unit (CPU). Functions of the communication device 42 may be realized by arbitrary hardware, software, firm ware or a combination thereof. For example, some or all of the functions of the communication device 42 may be realized by an application specific integrated circuit (ASIC), a field programmable gate array (FPGA), or a digital signal processor (DSP).

Likewise, the charge controller 44 may be constituted by an ECU. Functions of the charge controller 44 may be realized by arbitrary hardware, software, firm ware or a combination thereof. Some or all of the functions of the charge controller 44 may be realized by the communication device 42 and some or all of the functions of the communication device 42 may be realized by the charge controller 44. For example, the charge controller 44 and communication device 42 may be realized by a single ECU.

As shown in FIG. 1, in the state in which the charging plug 20 is connected to the vehicle, the vehicle charging apparatus 40 is connected to the charging station side communication device 12 of the charging station 10 via a communication line 50. This enables the communication device 42 of the vehicle charging apparatus 40 to communicate with the charging station side communication device 12 of the charging station 10 via the communication line 50. The communication may be power line communications (PLC) using power line 54 or may be communication using communication line 50 other than the power line 54. In the former case, the communication line 50 and the power line 54 become one common line (that is, communication signal is superimposed, for example, on waveforms of charging AC voltage). In the latter case, a communication signal may be superimposed on a CPLT signal (DC voltage). A communication mode of the communication device 42 will be described later in detail.

In the state in which the charging plug 20 is connected to the vehicle, a signal indicating on/off state of the unlocking button 22 is input to the vehicle charging apparatus 40 via a signal line 52. This enables the vehicle charging apparatus 40 to detect an operation state of the unlocking button 22.

In the state in which the charging plug 20 is connected to the vehicle, the battery 60 is connected to the external power supply 14 via the power line 54. This makes it possible to charge the battery 60 from the external power supply 14. The battery 60 may be charged from the external power supply 14 under control by the charge controller 44.

Figure 2:
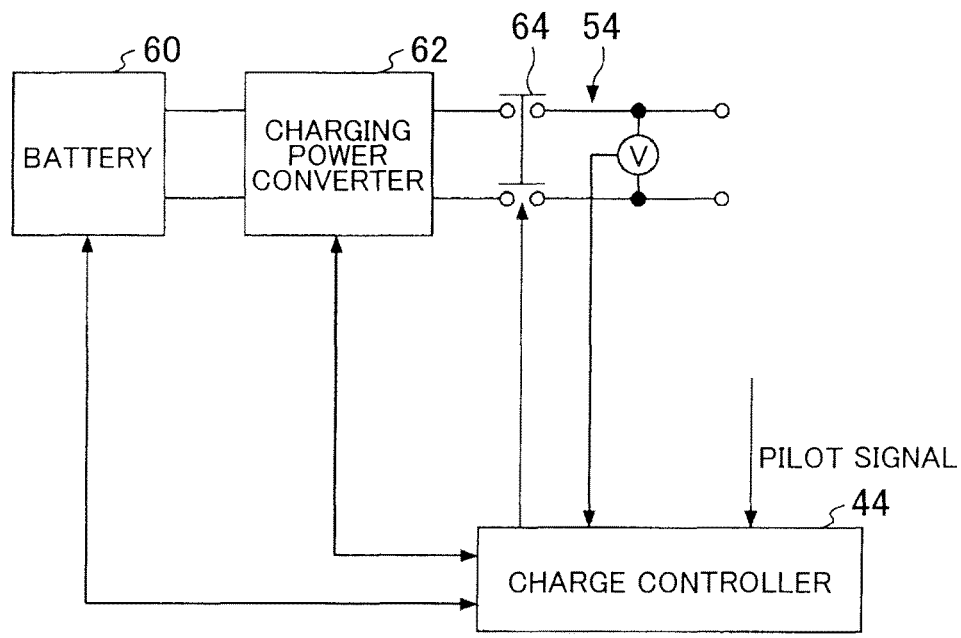
FIG. 2 is a diagram showing a configuration of a major part relating to charge control performed by the charge controller shown in FIG. 1.

FIG. 2 is a diagram showing a configuration of a major part relating to charge control by the charge controller 44. FIG. 2 shows only the configuration of the vehicle side.

As shown in FIG. 2, the power line 54 is connected to the battery 60 via a relay 64 and a charging power converter 62. The charge controller 44 may receive an input of a voltage of the power line 54 (voltage from the external power supply 14), a pilot signal (partial voltage level of a CPLT signal), or a state of the battery 60.

The on/off state of the relay 64 is controlled by the charge controller 44. When the relay 64 is turned on, the battery 60 is charged from the external power supply 14. When the relay 64 is turned off, the charge from the external power supply 14 to the battery 60 is stopped.

The charging power converter 62 is controlled by the charge controller 44. The charging power converter 62 converts AC power supplied from the external power supply 14 into DC power for charging the battery 60. However, a configuration is also possible in which the battery 60 is charged directly from the external power supply 14. In this case, the charging power converter 62 can be omitted.

Figure 3:
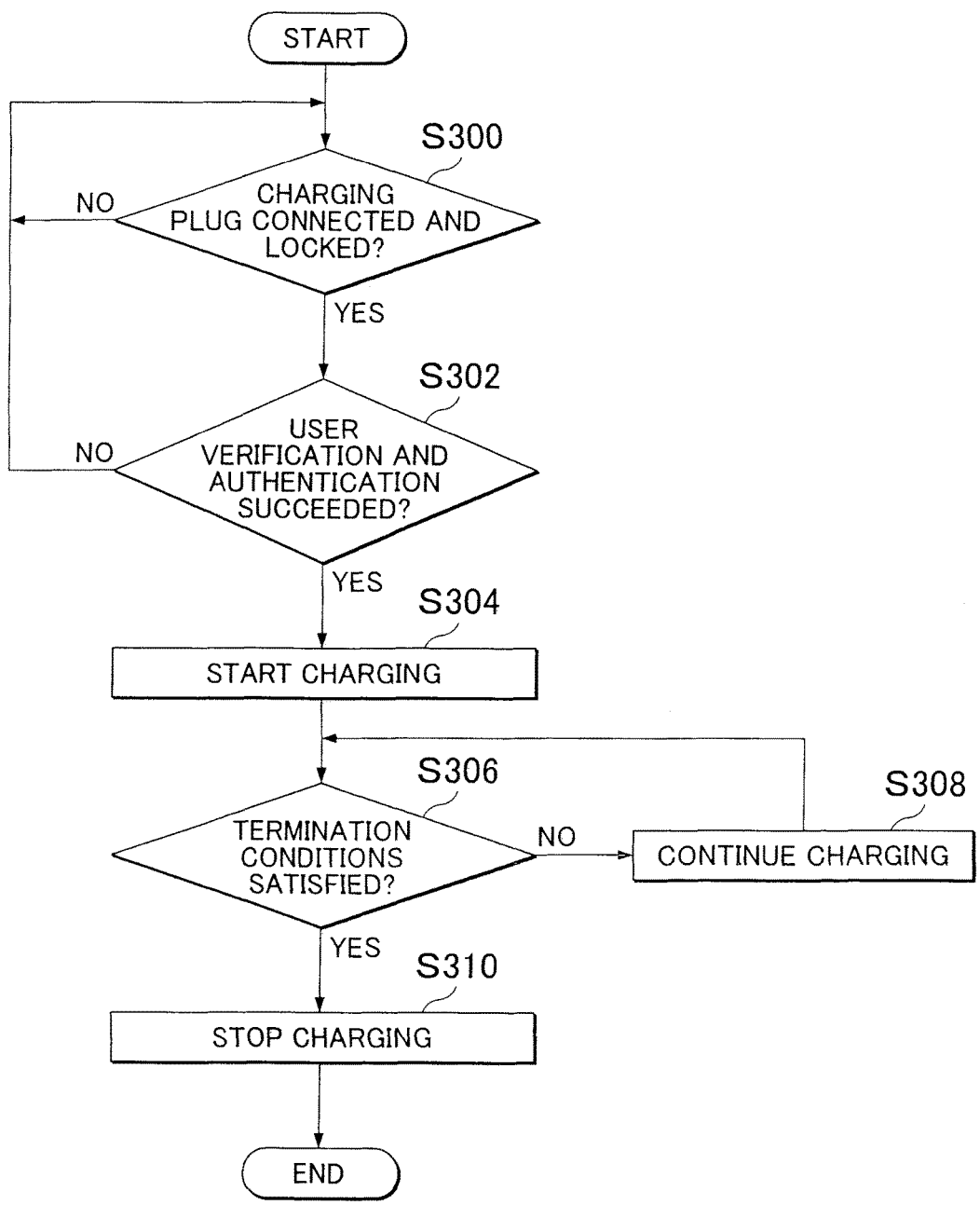
FIG. 3 is a flowchart showing an example of principal processing performed by the charge controller shown in FIG. 1.

FIG. 3 is a flowchart showing an example of principal processing realized by the charge controller 44. The processing routine shown in FIG. 3 may be repeated at predetermined intervals.

In step 300, it is determined whether or not the charging plug 20 is connected and locked to the vehicle. This determination may be made based on the on/off state of the unlocking button 22 or a voltage of the power line 54. When the charging plug 20 is connected and locked to the vehicle, the processing proceeds to step 302, and otherwise returns to step 300.

In step 302, it is determined whether or not user verification and authentication are successful between the communication device 42 and the charging station side communication device 12. This determination depends on communication processing by the communication device 42, and is made based on information from the communication device 42. If the user verification and authentication are successful, the processing proceeds to step 304. If the user verification and authentication are not successful, the processing returns to step 300.

In step 304, charging is started. Specifically, the relay 64 is turned on and the charging power converter 62 is controlled.

In step 306, it is determined whether or not charging termination conditions have been satisfied. The charging termination conditions are satisfied when the unlocking button 22 of the charging plug 20 is operated (when an unlocking operation is done). The charging termination conditions may also be satisfied when the battery 60 has been fully charged, or a charging termination signal is supplied (from another ECU or the charging station 10). When the charging termination conditions are satisfied, the processing proceeds to step 310, whereas when the charging termination conditions are not satisfied, the processing proceeds to step 308.

In step 308, charging is continued, and then the processing returns to step 306. In this manner, charging is continued until the charging termination conditions are satisfied.

In step 310, the relay 64 is turned off and charging is stopped (terminated). According to the processing shown in FIG. 3, charging is not started immediately after the charging plug 20 is connected and locked to the vehicle, but charging is started only when the user verification and authentication are successful between the communication device 42 and the charging station side communication device 12 (step 304). If operation of the unlocking button 22 is detected during charging, the charging is immediately stopped by the charge controller 44 for the sake of safety (step 310).

According to the processing shown in FIG. 3, the operation is carried out as described below, for example, when a user wants to terminate charging while the charging is going on and presses the unlocking button 22 of the charging plug 20, but he/she changes his/her mind to continue charging and stops pressing the unlocking button 22 of the charging plug 20. Firstly, when the user wants to terminate charging and presses the unlocking button 22 of the charging plug 20, the charging termination conditions are satisfied (Yes in step 306), and the charging is stopped (step 310). When the user then stops pressing the unlocking button 22 of the charging plug 20 (when the unlocking button 22 is restored to its original position), the charging plug 20 returns to the state in which it is connected and locked to the vehicle. Therefore, when the user stops pressing the unlocking button 22 of the charging plug 20, the affirmative determination in step 300 is restored, and if the user verification and authentication are successful between the communication device 42 and the charging station side communication device 12, charging is resumed. If the user verification and authentication are not successful, charging is not resumed until the user verification and authentication become successful between the communication device 42 and the charging station side communication device 12.

Figure 4:
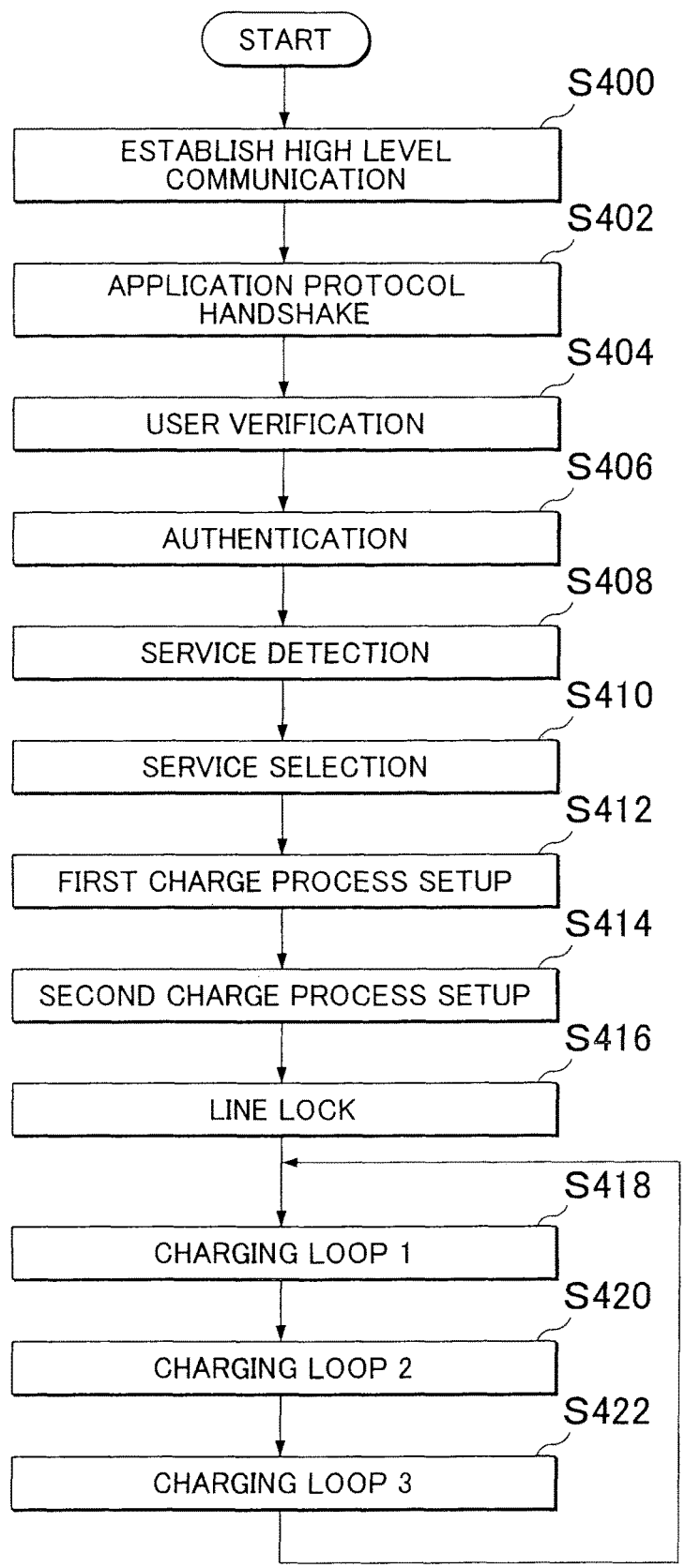
FIG. 4 is a diagram illustrating standards for communication sequence performed between a communication device of the vehicle charging apparatus and a charging station side communication device shown in FIG. 1.
Figure 5:
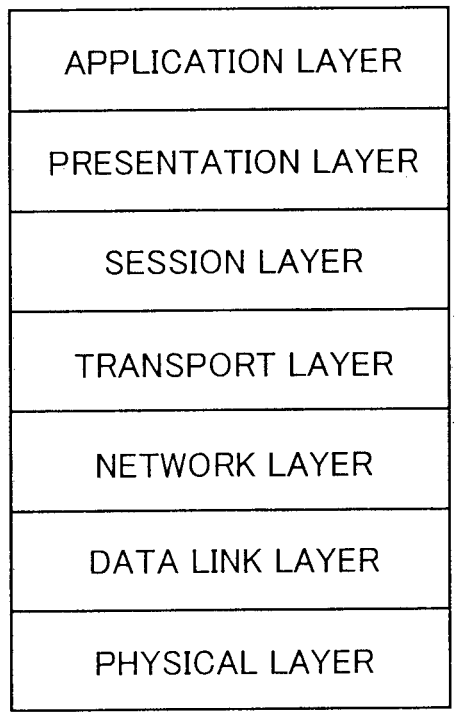
FIG. 5 is a diagram illustrating layers of OSI reference model, that is a model in which a communication function according to this embodiment is divided into a layered structure.

FIG. 4 is a diagram illustrating standards for communication sequence performed between the communication device 42 and the charging station side communication device 12. FIG. 5 is a diagram showing layers of the OSI reference model which illustrates communication functions in a layered structure. The OSI reference model includes, in descending order from the top down, layer 7 as an Application layer, layer 6 as a Presentation layer, layer 5 as a Session layer, layer 4 as a Transport layer, layer 3 as a Network layer, layer 2 as a Data Link layer, and layer 1 as a Physical layer.

Communication is performed between the communication device 42 and the charging station side communication device 12 based on the OSI reference model shown in FIG. 5, for example, in the communication sequence specified in the standards shown in FIG. 4.

Specifically, when the charging plug 20 is connected and locked to the vehicle, processing steps from step 400 to step 416 are performed sequentially. High-level communication is established in step 400, application protocol handshake is performed in step 402, user verification is performed in step 404, authentication is performed in step 406, service detection is performed in step 408, service selection is performed in step 410, a first charge process setup is performed in step 412, a second charge process setup is performed in step 414, and line lock is performed in step 416. Subsequently, the communication sequence enters a charging loop (steps 418 to 420), and steps 418 to 420 are repeated in a loop.

Figure 6:
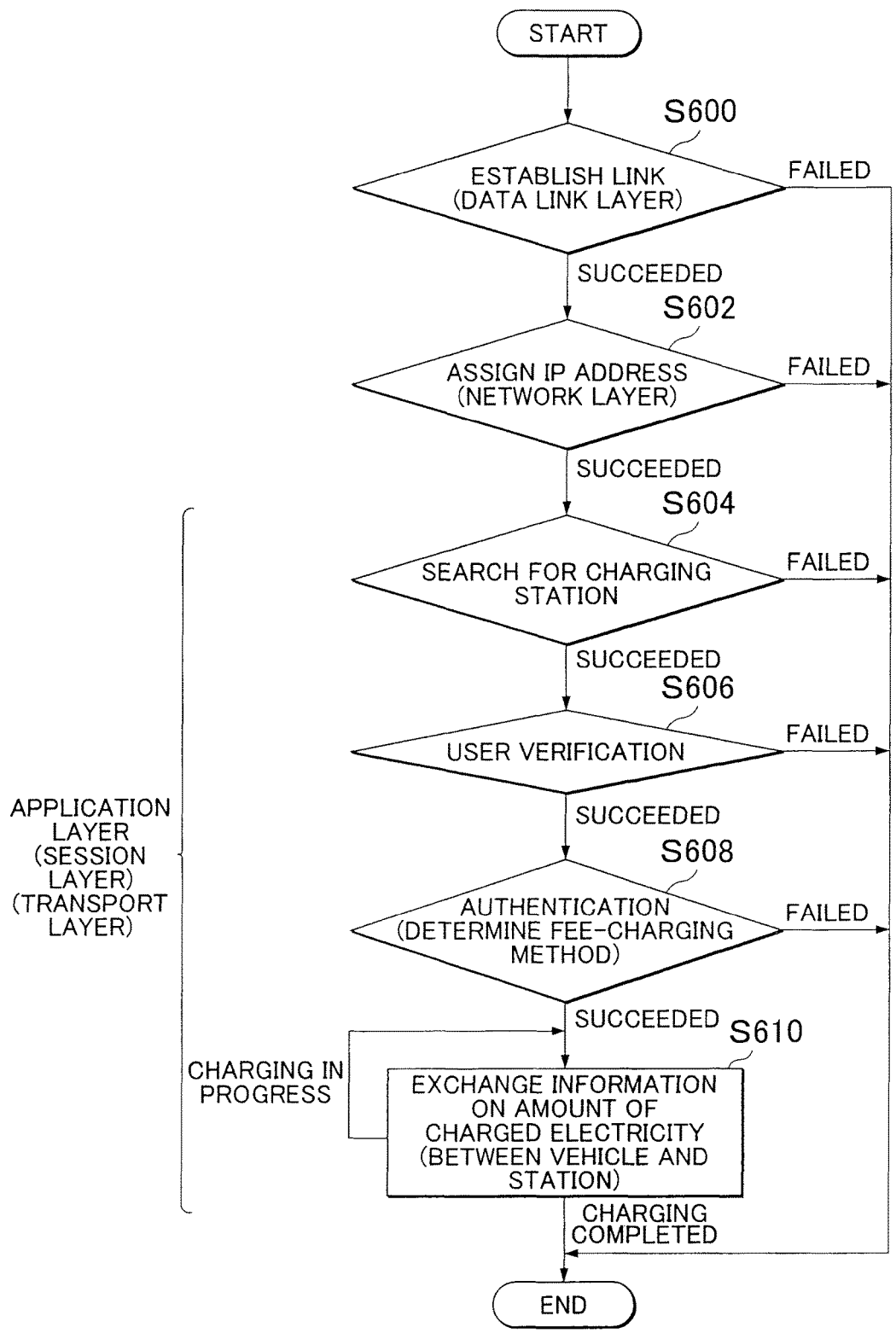
FIG. 6 is a flowchart showing an example of a principal part of communication processing performed between the communication device and the charging station side communication device according to the communication sequence shown in FIG. 4.

FIG. 6 is a flowchart showing an example of a major part of the communication processing performed between the communication device 42 and the charging station side communication device 12 according to the communication sequence shown in FIG. 4.

In step 600, a link is established between the communication device 42 and the charging station side communication device 12. This is performed in the Data Link layer. If the Data Link layer fails to establish the link, the processing terminates. If the Data Link layer succeeds in establishment of the link, the processing proceeds to step 602.

In step 602, an Internet Protocol (IP) address is assigned. This is done in the Network layer. If the Network layer fails to assign an IP address, the processing terminates. If the Network layer succeeds in assignment of the IP address, the processing proceeds to step 604. After step 604 onwards, the communication is performed in the Application layer, the Session layer, and the Transport layer.

In step 604, a charging station is searched for. The search for a charging station corresponds to processing for confirming that an entity with which the communication device 42 is communicating is the charging station 10 (charging station side communication device 12). If the processing fails to search for the charging station, the processing is terminated. If it succeeds in search for the charging station, the processing proceeds to step 606.

In step 606, user verification is performed. The user verification may be performed based on identification (ID) information such as user ID or vehicle ID. The ID information may be input interactively by the user, or may be automatically extracted from registered information. If the user verification is failed, the processing is terminated. If the user verification is successful, the processing proceeds to step 608.

In step 608, authentication is performed. The authentication processing may include processing for determining a fee-charging method. The fee-charging method corresponds to a method in which the user pays a fee for charging the vehicle. The fee-charging method may be input by the user interactively, or may be automatically determined based on registered information in the same manner as in the electronic toll collection system (ETC). If the authentication is failed, the processing is terminated. If the authentication is successful, the processing proceeds to step 610.

In step 610, information on amount of charged electricity is repeatedly exchanged between the communication device 42 and the charging station side communication device 12. The processing in step 610 corresponds to the charging loop shown in FIG. 4 (steps 418 to 420). The processing in step 610 is performed repeatedly during charging, and once the charging is completed, the communication processing shown in FIG. 6 terminates normally. The amount of charged electricity can be a value indicating how much electricity the on-vehicle battery has been charged. The charged amount information can be utilized, for example, for billing the user. The cycle for repeating the exchange of charged amount information may be from several to around ten seconds, for example. The exchange of charged amount information between the communication device 42 and the charging station side communication device 12 can be used for the purpose of mutually checking whether or not the charging is being performed normally. Alternatively, the exchange of information for this purpose may be performed as processing in step 610 separately from the exchange of charged amount information.

FIG. 7 is a flowchart illustrating an example of communication disconnection determination processing performed by the communication device 42. The processing routine shown in FIG. 7 is performed repeatedly at predetermined cycles during the processing of step 610 shown in FIG. 6 (that is, in parallel with the processing of step 610).

In step 700, it is determined whether or not the unlocking button 22 is operated. It can be determined whether or not the unlocking button 22 is operated based on the on/off state of the unlocking button 22. If the unlocking button 22 is operated (that is, if the unlocking button 22 is pressed), the processing proceeds to step 702.

In step 702, a tinier is incremented. This incremental amount may correspond to the cycle at which the processing routine is repeated. The initial value of the timer is set to zero.

In step 704, it is determined whether or not the timer indicates a time period greater than a predetermined time period. In other words, it is determined whether or not the operation of the unlocking button 22 is continued for the predetermined time period or more. The predetermined time period may be about eight seconds, for example. If the timer indicates a time period greater than the predetermined time period, the processing proceeds to step 708. If the timer indicates a time period less than the predetermined time period, the processing proceeds to step 706.

In step 706, the communication in the Application layer is stopped while retaining the established communication session. Thus, although the communication in the Application layer (for example, exchange of charged amount information in S610) is stopped, the communication session established in the Session layer and the layers therebelow is still retained.

In step 708, the communication session in the Session layer and the layers therebelow is also stopped. Specifically, the communication between the communication device 42 and the charging station side communication device 12 is disconnected.

In step 710, it is determined whether or not the timer indicates zero. If the timer indicates zero, the processing in the current cycle is terminated and returns to step 700. In the previous processing cycle as well, the timer indicates zero if the unlocking button 22 is not operated, and the processing returns to step 700. In this case, the communication between the communication device 42 and the charging station side communication device 12 is retained. Accordingly, in this case, the communication in the Application layer (for example, the exchange of charged amount information in S610) can be performed if necessary. If the timer does not indicate zero, the processing proceeds to step 712. When the timer does not indicate zero, it means that an operation of the unlocking button 22 has been detected at least in the previous processing cycle. Therefore, in this case, the communication in the Application layer is stopped.

In step 712, the timer is reset to zero (initial value). In step 714, the communication between the communication device 42 and the charging station side communication device 12 is resumed. In other words, the communication in the Application layer (for example, exchange of charged amount information in S610) is resumed.

According to the processing shown in FIG. 7, as described above, the communication between the communication device 42 and the charging station side communication device 12 is disconnected only when the operation of the unlocking button 22 is continued for a predetermined time period or more (step 708). However, only the communication in the Application layer is stopped while the communication session in the Session layer and the layers therebelow is retained until the time period for which the operation of the unlocking button 22 is continued exceeds the predetermined time period (step 706). Therefore, if the operation of the unlocking button 22 is released before the operation of the unlocking button 22 is continued for the predetermined time period, the communication in the Application layer can be immediately resumed (step 714). This means that, in the processing in step 714, the communication in the Application layer (for example, exchange of the charged amount information in S610) can be immediately resumed without the need of redoing the processing steps in steps 600 to 608 in FIG. 6 (or processing steps in steps 400 to 416 in FIG. 4).

Until the operation of the unlocking button 22 is continued for the predetermined time period or more, only the communication in the Application layer is stopped while the communication session in the Session layer and the layers therebelow is retained. This makes it possible to resume the charging immediately if the operation of the unlocking button 22 is released before the operation of the unlocking button 22 is continued for the predetermined time period (that is, the locked state of the charging plug 20 is established again) (see step 304 in FIG. 3). Specifically, since the communication session in the Session layer and the layers therebelow is retained, the successful state of the user verification and authentication is sustained, which makes it possible to resume the charging quickly. If the communication session in the Session layer and the layers therebelow is disconnected, the charge controller 44 will be required to wait, before restarting charging, until the communication device 42 carries out again the processing steps in steps 600 to 608 in FIG. 6 (or the processing steps in steps 400 to 416 in FIG. 4). This means that the restart of charging is delayed by that much.

When the user removes the charging plug 20 from the vehicle while pressing the unlocking button 22, the charging plug 20 is physically removed from the vehicle (that is, the communication line 50 is physically disconnected), and hence the communication between the communication device 42 and the charging station side communication device 12 is physically disconnected.

When the user wants to terminate charging, the user removes the charging plug 20 from the vehicle while pressing the unlocking button 22 of the charging plug 20. In some cases, however, even after the user presses the unlocking button 22 of the charging plug 20, he/she might change his/her mind and want to continue charging. In other cases, the user might erroneously press the unlocking button 22 for some reason, or a signal indicating the on state of the unlocking button 22 might be erroneously generated due to effects of noise or the like. According to this embodiment of the invention, as shown in FIG. 3, the operation of the unlocking button 22 is detected under such situations as well, and thus the charging is stopped immediately by the charge controller 44 for the sake of safety (step 310 in FIG. 3). According to the embodiment, however, the charging that has been once stopped in response to the operation of the unlocking button 22 can be resumed quickly, and hence the convenience can be improved.

While a preferred embodiment of the invention has been described in detail, the invention is not limited thereto, but various changes, modification and variations may be made in the foregoing embodiment without departing from the scope of the invention.

For example, while in the foregoing embodiment, the charging station side communication device 12 is arranged within the charging station 10, the charging station side communication device 12 may be arranged at any location in the charging facility including the charging station 10. For example, the charging station side communication device 12 may be arranged at a location separate from the charging station 10. Alternatively, the charging station side communication device 12 may be arranged within the charging plug 20. In this case, the charging plug 20 is a member provided on the side of the charging station 10. Therefore, the charging plug 20 constitutes the charging facility together with the charging station 10.

While in the foregoing embodiment, the communication between the communication device 42 and the charging station side communication device 12 is realized wiredly with use of the communication line 50, it may be realized wirelessly. In the case of wireless communication, the communication between the communication device 42 and the charging station side communication device 12 can be disconnected (that is, the communication session in the Session layer and the layers therebelow can be disconnected) when the charging plug 20 is physically removed from the vehicle.

The invention claimed is:

1. A vehicle charging apparatus mounted on a vehicle for charging an on-vehicle battery from an external power supply with a charging plug connected to the vehicle, the vehicle charging apparatus comprising:
a communication device having an electronic control unit, the electronic control unit being configured to:
perform communication with a charging facility providing the external power supply with the charging plug connected and locked to the vehicle, and
to prohibit disconnection of the communication when an unlocking operation to unlock the charging plug is executed during charging from the external power supply to the on-vehicle battery,
wherein the electronic control unit is configured to perform the communication based on an OSI reference model having a layered structure, the layered structure including an Application layer, a Session layer, and layers therebelow,
wherein the electronic control unit is configured to prohibit disconnection of the communication by stopping communication in the Application layer of the OSI reference model, while retaining an established state of a communication session in the Session layer and the layers therebelow.

2. The vehicle charging apparatus according to claim 1, wherein the electronic control unit is configured to disconnect the communication when the unlocking operation is executed continuously for a predetermined time period during charging from the external power supply to the on-vehicle battery.

3. The vehicle charging apparatus according to claim 1, wherein the electronic control unit is configured to disconnect the communication when the charging plug is physically removed from the vehicle during charging from the external power supply to the on-vehicle battery.

4. The vehicle charging apparatus according to claim 1, wherein the electronic control unit is configured to disconnect the communication session in the Session layer and the layers therebelow in the OSI reference model based on which the communication is performed.

5. The vehicle charging apparatus according to claim 1, wherein the electronic control unit is configured to:
perform communication with the charging facility in the Application layer in the OSI reference model based on which the communication is performed after performing communication for user verification and authentication with the charging facility when the charging plug is connected and locked to the vehicle, and
resume the communication in the Application layer without performing the communication for user verification and authentication when an unlocking operation to unlock the charging plug is executed during charging from the external power supply to the on-vehicle battery but the unlocking operation is cancelled without being continued for the predetermined time period, and the charging plug is locked again.

6. The vehicle charging apparatus according to claim 1, wherein the electronic control unit is configured to communicate information on an amount of charged electricity with the charging facility in the Application layer in the OSI reference model based on which the communication is performed, during charging from the external power supply to the on-vehicle battery.

7. The vehicle charging apparatus according to claim 1, further comprising a charge controller that is configured to perform charging from the external power supply to the on-vehicle battery when the charging plug is connected and locked to the vehicle, and a user verification and authentication are successful through communication between the communication device and the charging facility.

8. The vehicle charging apparatus according to claim 7, wherein the charge controller is configured to suspend the charging from the external power supply to the on-vehicle battery when an unlocking operation to unlock the charging plug is executed during charging from the external power supply to the on-vehicle battery.

* * * * *